US00RE42617E

(19) United States
(12) Reissued Patent
Wei et al.

(10) Patent Number: US RE42,617 E
(45) Date of Reissued Patent: Aug. 16, 2011

(54) IMAGE PROJECTION SYSTEM WITH AN INVISIBLE-LIGHT REFLECTOR FOR HEAT DISSIPATION

(75) Inventors: Hung-Jen Wei, Nan-Tou Hsien (TW); Chih-Chang Chou, Taipei Hsien (TW); Ming-Kuen Lin, Yun-Lin Hsien (TW)

(73) Assignee: BenQ Corporation, Taipei (TW)

(21) Appl. No.: 12/122,652

(22) Filed: May 16, 2008

Related U.S. Patent Documents

Reissue of:

(64) Patent No.: 7,048,387
Issued: May 23, 2006
Appl. No.: 10/604,722
Filed: Aug. 13, 2003

(30) Foreign Application Priority Data

Jan. 29, 2003 (TW) ..... 092102065

(51) Int. Cl.

| | |
|---|---|
| ***G03B 21/14*** | (2006.01) |
| ***G03B 21/28*** | (2006.01) |
| ***G02B 1/00*** | (2006.01) |
| ***G02B 5/28*** | (2006.01) |
| ***F21V 9/00*** | (2006.01) |
| ***G02F 1/00*** | (2006.01) |
| ***H04N 5/74*** | (2006.01) |

(52) U.S. Cl. ..... 353/99; 353/37; 359/584; 359/589; 362/293; 348/771

(58) Field of Classification Search ..... 353/98, 353/99, 52, 55, 57, 77, 78, 30, 37, 20; 359/449, 359/584, 589; 348/342, 756, 759, 766, 770, 348/771, 786; 362/583, 293; 349/104
See application file for complete search history.

(56) References Cited

U.S. PATENT DOCUMENTS

| | | | | |
|---|---|---|---|---|
| 5,615,938 | A * | 4/1997 | Lemke | 362/18 |
| 5,671,993 | A * | 9/1997 | Shikama | 353/77 |
| 5,803,566 | A * | 9/1998 | Ogino | 353/60 |
| 6,056,405 | A * | 5/2000 | Heintz et al. | 353/85 |
| 6,111,700 | A * | 8/2000 | Kobayashi et al. | 359/627 |
| 6,478,429 | B1 * | 11/2002 | Aritake et al. | 353/31 |
| 6,482,150 | B2 * | 11/2002 | Utsui | 600/178 |
| 2002/0064046 | A1 * | 5/2002 | Davis et al. | 362/298 |
| 2003/0063261 | A1 * | 4/2003 | Li | 353/20 |
| 2003/0184718 | A1 * | 10/2003 | Childers et al. | 353/122 |

FOREIGN PATENT DOCUMENTS

TW 00433473 * 5/2001

* cited by examiner

*Primary Examiner* — Rochelle-Ann J Blackman

(57) ABSTRACT

An image projection system includes a light source for generating a light beam, a reflective housing, and an invisible-light reflector. The reflective housing includes an opening and forms an accommodating space for accommodating the light source so that the light beam can emit from the opening along an optical path. The invisible-light reflector, whose normal is arranged to form an acute angle with the optical path, is installed at a reflecting position intersecting with the optical path outside the opening of the reflective housing. The invisible light of the light beam will be reflected back to the accommodating space by the invisible-light reflector without any destruction caused by the invisible light.

20 Claims, 7 Drawing Sheets

IMAGE PROJECTION SYSTEM WITH AN INVISIBLE-LIGHT REFLECTOR FOR HEAT DISSIPATION

Matter enclosed in heavy brackets [ ] appears in the original patent but forms no part of this reissue specification; matter printed in italics indicates the additions made by reissue.

BACKGROUND OF INVENTION

1. Field of the Invention

The invention relates to an image projection system, and more particularly, to an image projection system that is installed with an_invisible-light reflector according to a predetermined angle and a predetermined position for heat dissipation.

2. Description of the Prior Art

With the promotion of the electro-optic techniques, projecting devices are widely used in various applications. Nowadays, the projecting devices include CRT projectors, LCD projectors, and DMD-based DLP5. In addition, LCOS projectors are expected future stars in the projecting industry. The basic operating principle of various projecting devices is the same: utilizing a high-luminance light source to emit a light beam that then will be passed though some specific optical image modules, such as optical filter, to be projected on a screen with informative content. Generally, the optical power of the high-luminance light source will crucially affect the projecting performance of the projecting device. In brief, higher optical power of the high-luminance light source will lead to a better projecting performance of the projecting device.

Please refer to FIG. 1, which is an image projection system 10 according to the prior art. The image projection system 10 includes a light source 12, a reflective housing 14, an image module 16, and an optical component 18. The image projection system 10 may further comprise a glass 20 as an R-G-B color wheel or as a protection glass. The light source 12 is used to generate a light beam, and the reflective housing 14 can be an elliptic reflective housing. The light source 12 is installed at a focal point of the elliptic reflective housing 14, and the reflective housing 14 forms an accommodating space and includes an opening. The light source 12 is installed inside the accommodating space, so that the light beam generated by the light source 12 substantially propagates along an optical path through the opening away from the accommodating space after being reflected by the elliptic reflective housing 14. The image module 16 includes a plurality of controllable reflectors for generating a projecting beam containing an optical image. The optical component 18, which comprises prisms and lens, is used to focus and output the projecting beam containing the optical image.

Design of the high-luminance light source will crucially affect the projecting performance of the projecting device. In U.S. Pat. No. 6,281,620. "Lamp with IR reflectivity", Yeh et al. disclose a bulb that can be used to reflect infrared rays, and Yeh et al. also teach a method for increasing the luminance efficiency by focusing the reflected infrared rays on the lamp wick. In U.S. Pat. No. 6,398,367, "Light source device and projector using the light source device", Watanabe et al. teach that the light source 12 and the reflective housing 14 shown in FIG. 1 can be detachably integrated. In addition, Watanabe et al. also provide a protection for the image projection system 10 with a transparent front glass at the opening of the reflective housing 14. Moreover, in U.S. Pat. No. 6,185,047, "Image projection system packaged to operate lying flat with a very low profile", Peterson et al. further install a color wheel 20 coated with an ultraviolet-rays-proof coating in the system shown in FIG. 1 for filtering out the ultraviolet rays so that the ultraviolet rays will not damage the image module 16 and optical component 18 inside the image projection system 10. Designs similar to the above-mentioned structure can also be found in U.S. Pat. No. 6,299,310, "Luminous intensity detection and control system for slit lamps and slit lamp projections".

The above-mentioned prior-art techniques, which make use of a higher optical power of the high-luminance light source to improve the projecting performance of the projecting device, are no longer useful. First, when designers raise the optical power of the light source from about 100 W to higher than 200 W or 400 W. The heat dissipation becomes a problem difficult to handle in the image projection system 10 as shown in FIG. 1. The traditional design for heat dissipation including installing at least a fan in the image projection system cannot dissipate the infrared-ray heat generated from the light source. In addition, destructive infrared-ray heat combined with ultraviolet rays generated from the extremely-high-luminance light source may seriously damage all components of the image projection system 10 shown in FIG. 1, including the light source 12, the reflective housing 14, and so on. Therefore, the image projection system installed with the extremely-high-luminance light source should be equipped with an effective heat-dissipation design.

SUMMARY OF INVENTION

It is therefore a primary objective of the claimed invention to provide an image projection system that is installed with an invisible-light reflector according to a predetermined angle and a predetermined position for heat dissipation to solve the above-mentioned problems.

In the claimed invention, an image projection system is installed with an invisible-light reflector for confining the exceeding invisible light, including infrared rays and ultraviolet rays, in an accommodating space formed by a reflective housing for protecting the image projection system. In addition, the invisible-light reflector is installed according to a predetermined angle and a predetermined position for avoiding damage to the light source and the reflective housing of the image projection system caused by the invisible light.

According to the claimed invention, an image projection system comprises a light source for generating a light beam, a reflective housing comprising a opening, the reflective housing forming an accommodating space, the light source installed inside the accommodating space so that the light beam generated by the light source substantially propagates along an optical path through the opening away from the accommodating space, and an invisible-light reflector installed at a reflecting position intersecting with the optical path outside the opening of the reflective housing, a normal of the invisible-light reflector and the optical path intersecting to form a predetermined angle so that invisible light of the light beam emitted from the opening will be reflected back into the accommodating space.

According to the claimed invention, an image projection system comprises a light source for generating a light beam, an elliptic reflective housing comprising an opening, the reflective housing forming an accommodating space, the light source installed inside the accommodating space so that the light beam generated by the light source substantially propagates along a major axis of the elliptic reflective housing through the opening away from the accommodating space, an image module comprising a plurality of controllable optical reflectors for modulating the light beam to generate a projecting beam containing an optical image, and an invisible-light reflector installed between the reflective housing opening and the image module and at a reflecting position at which the invisible-light reflector intersects the major axis of the elliptic reflective housing, a normal of the invisible-light reflector and the major axis intersecting to form a predetermined angle so that invisible light of the light beam emitted from the opening will be reflected back into the accommodating space.

According to the claimed invention, an image projection system comprises a light source for generating a light beam, a parabolic reflective housing comprising an opening, the parabolic reflective housing forming an accommodating space, the light source installed inside the accommodating space so that the light beam generated by the light source substantially propagates along an optical path through the opening away from the accommodating space, and an invisible-light reflector installed at a reflecting position intersecting with the optical path outside the opening of the reflective housing, a normal of the invisible-light reflector and the optical path intersecting to form a predetermined angle so that invisible light of the light beam emitted from the opening will be reflected back into the accommodating space and the invisible light will focus on a predetermined heat-dissipation position away from the focal point.

These and other objectives of the present invention will no doubt become obvious to those of ordinary skill in the art after reading the following detailed description of the preferred embodiment, which is illustrated in the various figures and drawings.

DETAILED DESCRIPTION

The image projection system of the present invention is installed with a light source with high luminance power, and a light beam generated by the light source includes visible light and invisible light harmful to electronic devices and optical components. The invisible light comprises (low-frequency) infrared rays and (high-frequency) ultraviolet rays. The infrared rays will generate heat and the ultraviolet rays will damage bonding between molecules. Due to higher-power light beams bringing more infrared rays and ultraviolet rays, the damage will be aggravated by the invisible light emitting from the light source with high luminance power.

Figure 1:
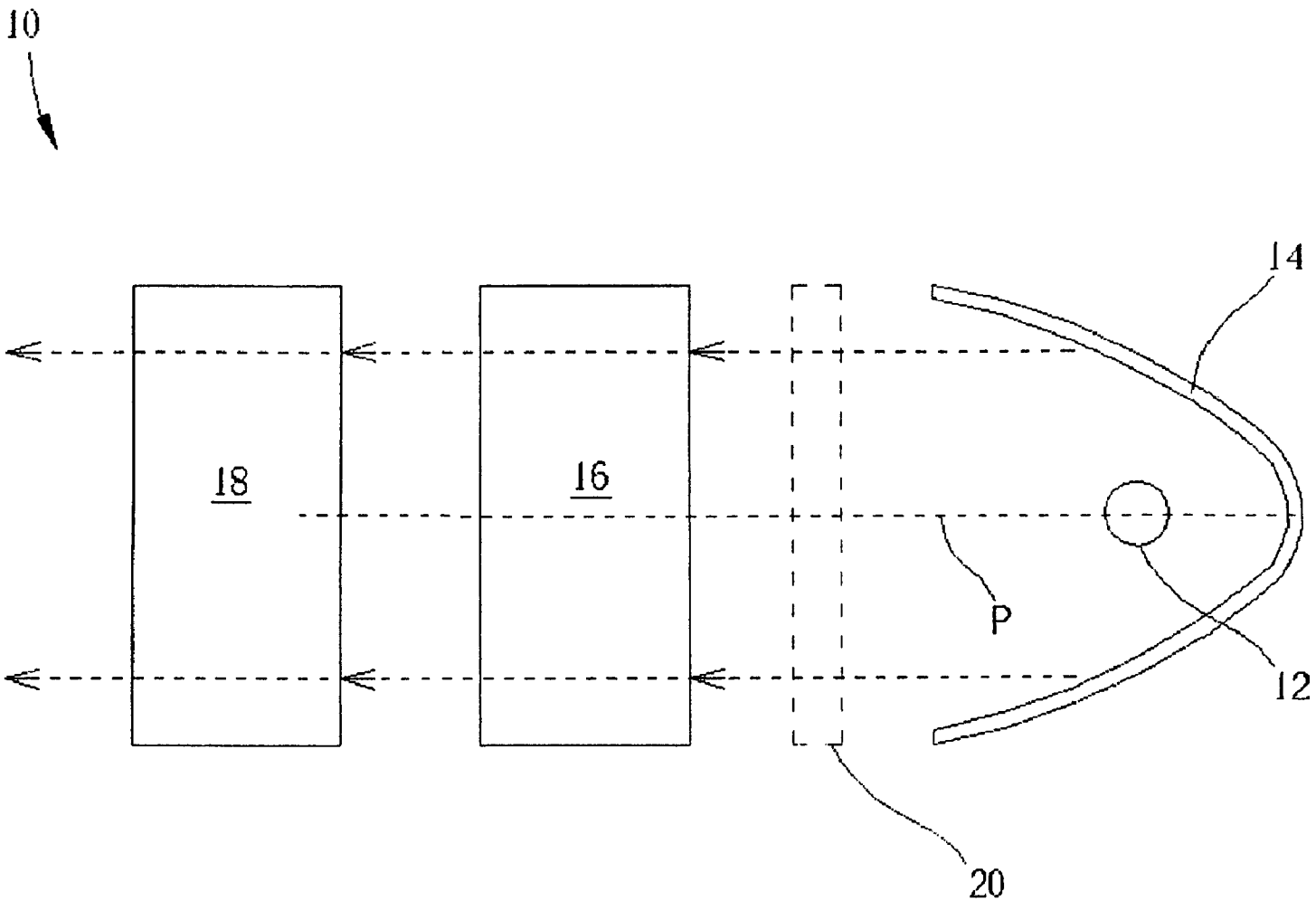
Fig. 1 Prior Art
FIG. 1 is an image projection system according to the prior art.
Figure 2:
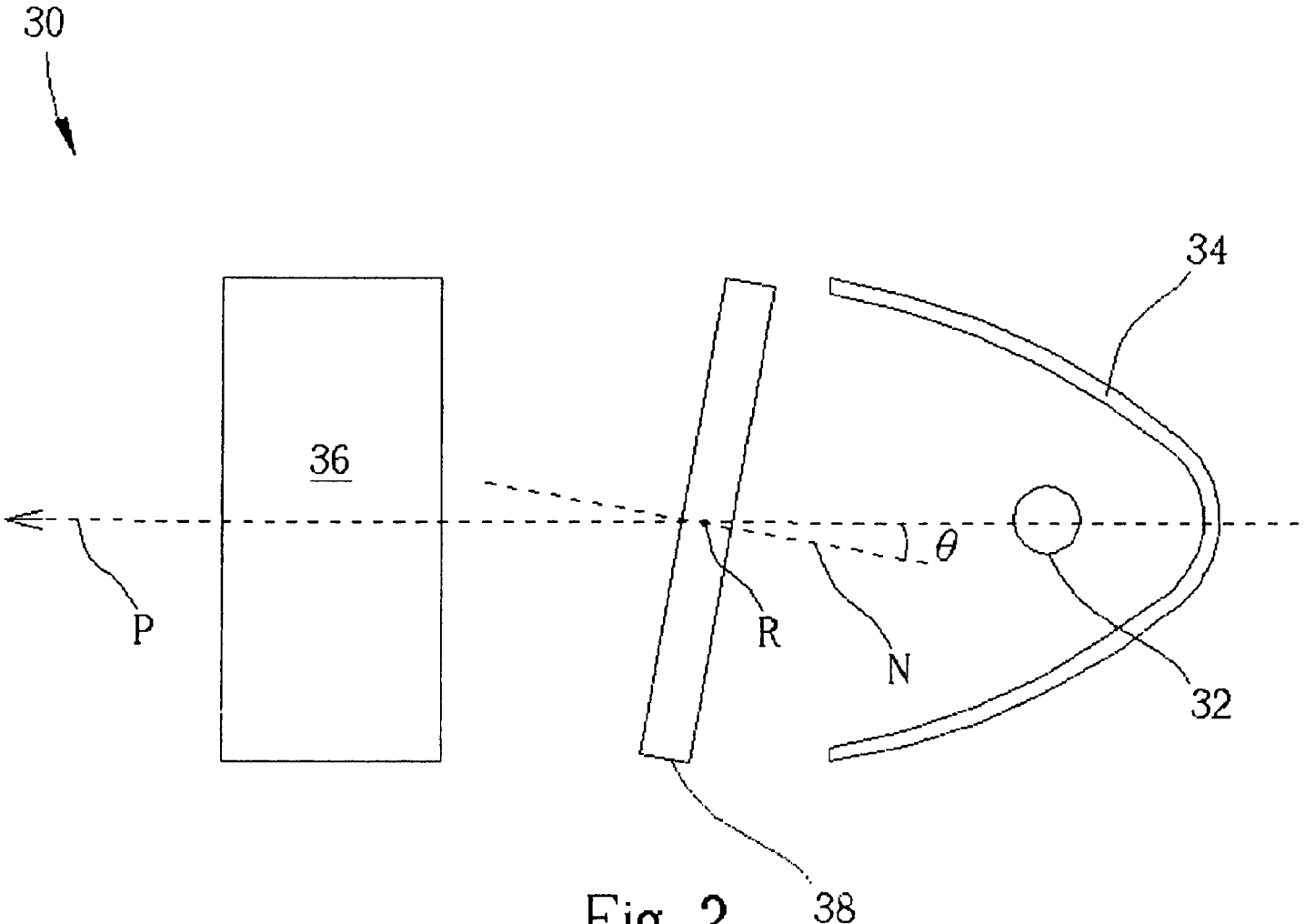
FIG. 2 is a schematic diagram of an embodiment of an image projection system according to the present invention.

Please refer to FIG. 2, which is a schematic diagram of an embodiment of an image projection system 30 according to the present invention. The image projection system 30 includes a light source 32, a reflective housing 34, an image module 36, and an invisible-light reflector 38. The light source 32 is used to generate a light beam, and the reflective housing 34 includes an opening.

The reflective housing 34 forms an accommodating space, and the light source 32 is installed inside the accommodating space, so that the light beam generated by the light source 32 substantially propagates along an optical path through the opening away from the accommodating space. The image module 36 includes a plurality of controllable optical reflectors used to modulate the light beam for generating a projecting beam containing an optical image. The image module 36 can be a digital micro-mirror device or a liquid crystal panel.

The invisible-light reflector 38 is installed between the opening of the reflective housing 34 and the image module 36 and located at a reflecting position intersecting with the optical path outside the opening of the reflective housing 34. The invisible-light reflector 38 can be used to reflect the invisible light of the light beam emitted from the opening back into the accommodating space. As shown in FIG. 2, when installing the invisible-light reflector 38, a normal N of the invisible-light reflector 38 and the optical path p form a predetermined angle θ, and the predetermined angle is not equal to 0 degrees.

One of the major characteristics of the present invention is the installation of the invisible-light reflector 38. Due to the invisible-light reflector 38 being installed at the reflecting position very close to the opening of the reflective housing 34, the light beam substantially propagating along the optical path will be blocked by the invisible-light reflector 38, and the invisible-light reflector 38 can reflect a great part of the invisible light of the light beam back into the accommodating space formed by the reflective housing 34 for avoiding damage to the image module 36 in the image projection system 30 caused by the invisible light.

Moreover, the invisible-light reflector 38 is installed tilted with respect to the optical path p by a specific angle. Please continue to refer to FIG. 2. The predetermined angle θ formed by the normal N of the invisible-light reflector 38 (the normal N is perpendicular to the invisible-light reflector 38) and the optical path p is an acute angle not equal to 0 degrees. When being practically implemented regarding the image projection system 30, the acute angle θ can be designed to be less than 45 degrees.

Figure 3:
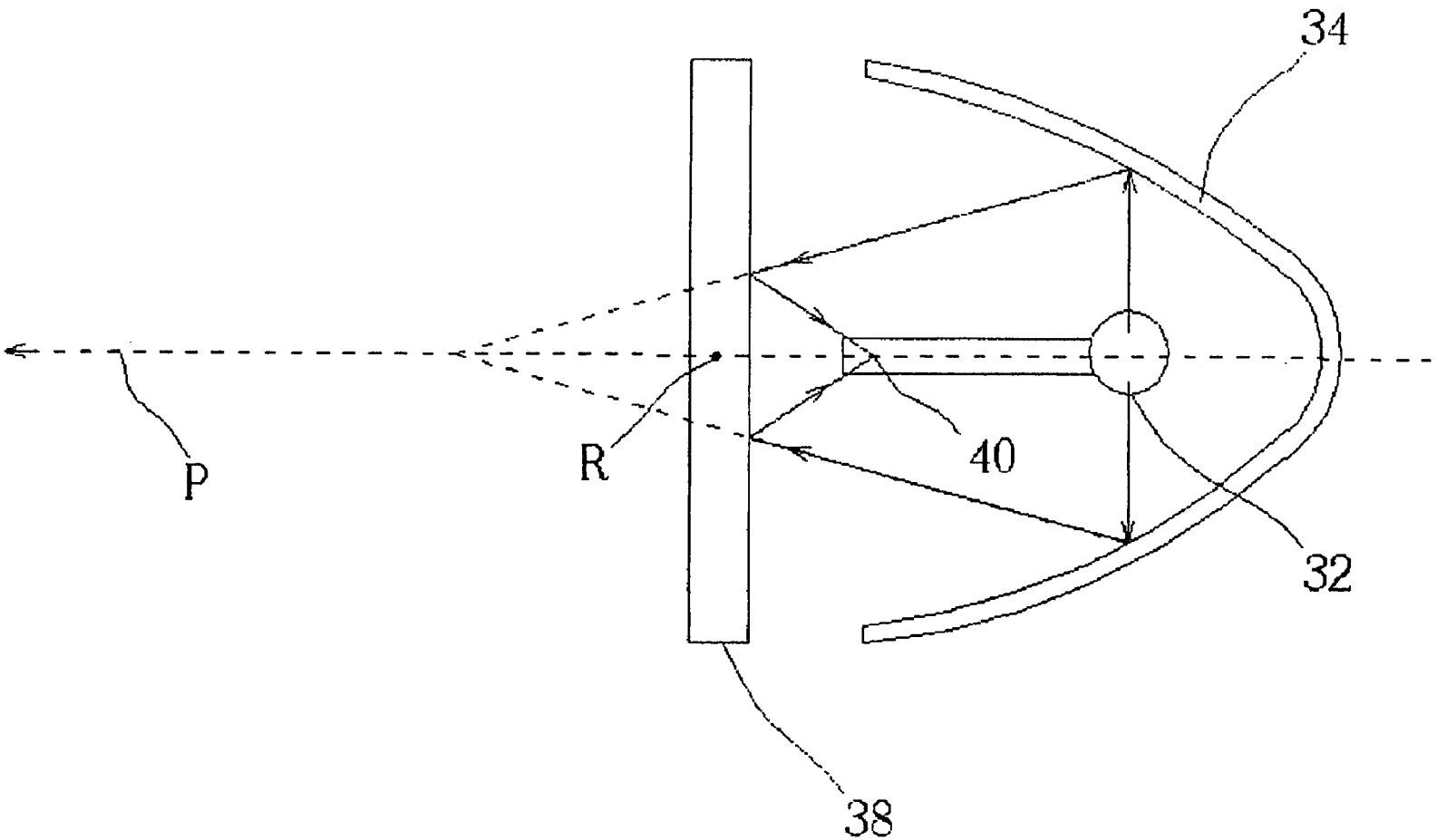
FIG. 3 is a schematic diagram of an embodiment of the present invention showing a predetermined angle equal to 0 degrees.

Please refer to FIG. 3, which is a schematic diagram of an embodiment showing that the predetermined angle θ is equal to 0 degrees. The image projection system 30 further includes a light tube 40 connected to the light source 32. The reflective housing 34 shown in FIG. 3 is an elliptic reflective housing (the formula of an ellipsoid can be described as follows: $Y^2/b^2=X^2/a^2+K$), and the light source 32 is installed at a focal point of the elliptic reflective housing 34. As is well known, the optical property of the elliptic surface is that the light emitted from a focal point will focus on another focal point. Due to the invisible-light reflector being perpendicular to the optical path p and the light tube 40 is close to another focal point at which the light source 32 is not located, the invisible light reflected (by the invisible-light reflector 38) back to the accommodating space will focus on the light tube 40 to probably damage the light tube 40. Furthermore, the invisible light reflected back to the accommodating space may focus on the light source 32 after being reflected again by the elliptic reflective housing 34 to probably damage the light source 32.

Figure 4:
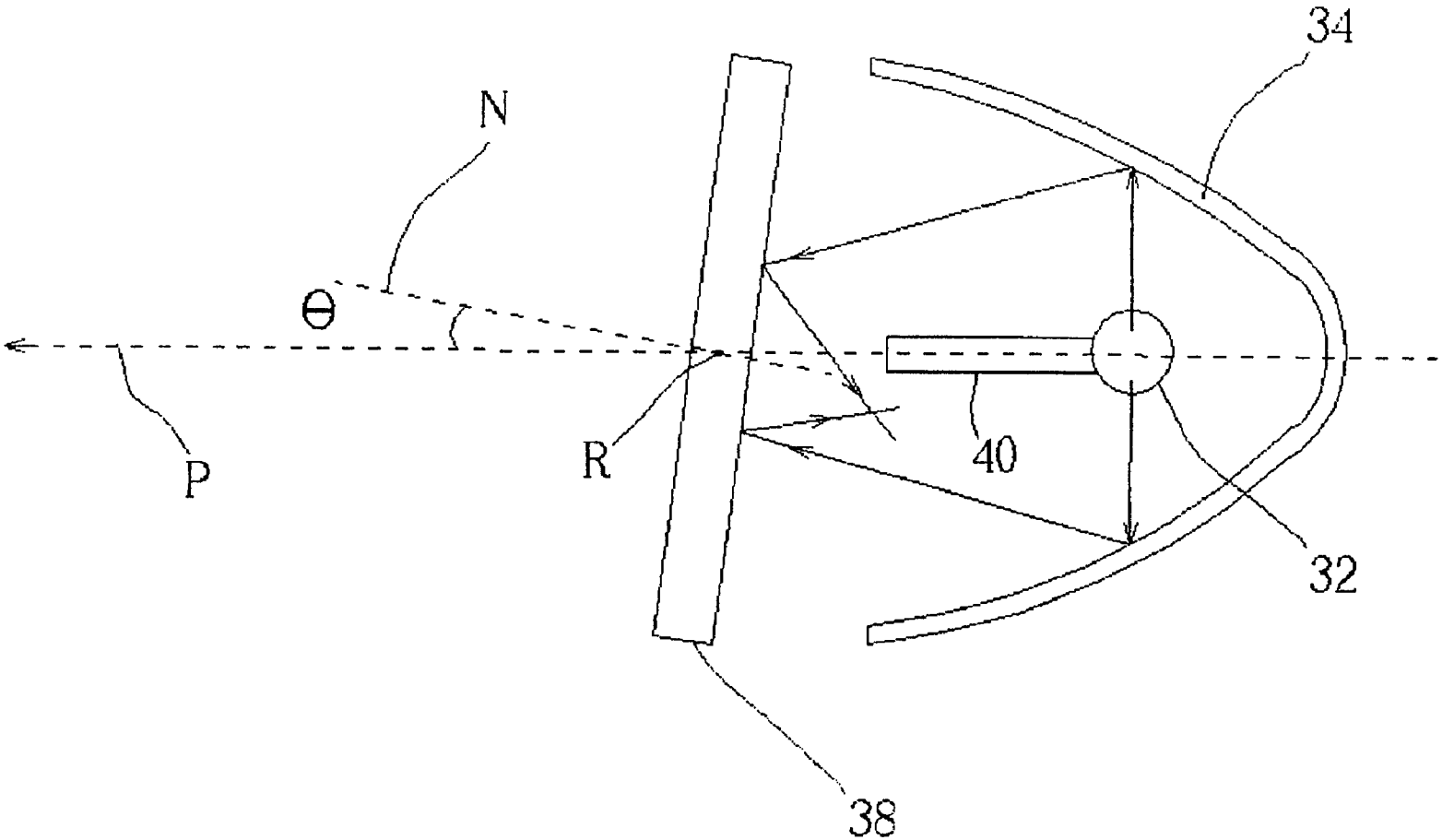
FIG. 4 is a schematic diagram of another embodiment of the present invention showing a predetermined angle not equal to 0 degrees.

Please refer to FIG. 4. As shown in FIG. 4, the reflective housing 34 is an elliptic reflective housing (the formula of the ellipsoid can be described as follows: $Y^2/b^2=X^2/a^2+K$), and the light source 32 is installed at a focal point of the elliptic reflective housing 34. Please notice that, in the present embodiment, the predetermined angle θ is an acute angle not equal to 0 degrees. Therefore, the invisible light reflected (by the invisible-light reflector 38) back to the accommodating space would deviate from the optical path p and not focus on the light tube 40. In addition, by properly adjusting the predetermined angle θ, the infrared rays reflected (by the invisible-light reflector 38) back to accommodating space will not focus on the reflective housing 34. Please notice that the optical path p is a major axis of the elliptic reflective housing in mathematic definition.

Figure 5:
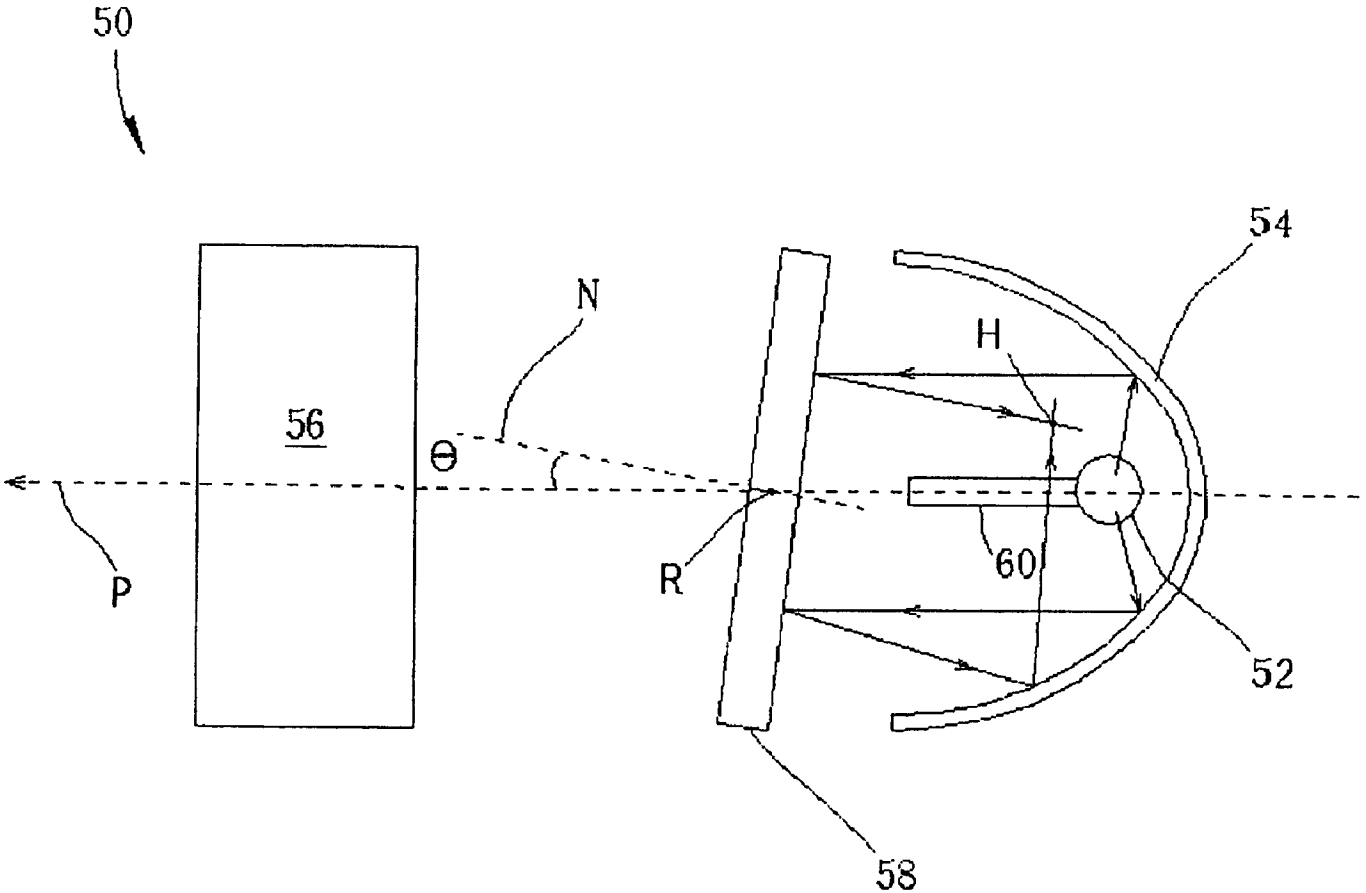
FIG. 5 is a schematic diagram of another embodiment of an image projection system according to the present invention.

Please refer to FIG. 5, which is a schematic diagram of another embodiment of an image projection system 50 according to the present invention. The present embodiment discloses a new type of reflective housing to illustrate the characteristics of the present invention for heat dissipation. The image projection system 50 includes a light source 52, a reflective housing 54, an image module 56, an invisible-light reflector 58, and a light tube 60. The light source 52 is used to generate a light beam. The reflective housing 54 includes an opening. The reflective housing 54 forms an accommodating space and the light source 52 is installed in the accommodating space for generating a light beam propagating along an optical path through the opening away from the accommodating space. The image module 56 includes a plurality of controllable optical reflectors used to modulate the light beam to generate a projecting beam.

The difference between the present embodiment and the above-mentioned embodiment is the type of the reflective housing. The reflective housing 54 in the present embodiment is a symmetric parabolic reflective housing (the formula of a parabola can be described as follows: $Y=X^2/a^2+K$), and the light source 52 is installed at a central point of the symmetric parabolic accommodating space. The optical path p is a parallel route by which the light beam propagates after being reflected by the symmetric parabolic reflective housing 54. Therefore, the light beam generated by the light source 52 will propagate substantially parallel to the optical path p of the symmetric parabolic reflective housing 54 through the opening away from the accommodating space.

The invisible-light reflector 58 is located at a reflecting position R intersecting with the optical path p outside the opening of the reflective housing 54, and the normal N of the invisible-light reflector 58 and the optical path p form a predetermined angle θ not equal to 0 degrees. The invisible-light reflector 58 is still used to reflect the invisible light of the light beam emitted from the opening back into the accommodating space. As shown in FIG. 5, the invisible light, after being reflected, will focus on a predetermined heat-dissipation position H away from the focal point for preventing damage to the light source 52 located at the focal point. In addition, the invisible light will not focus on the light tube 60, by properly adjusting the predetermined angle θ, the infrared rays reflected (by the invisible-light reflector 58) back to accommodating space will not focus on the reflective housing 54. Therefore, the light source 52, the light tube 60, and the reflective housing 54 can be well protected from the invisible light while the image module 56 is isolated from the infrared rays and ultraviolet rays, which are confined in the accommodating space.

Figure 6:
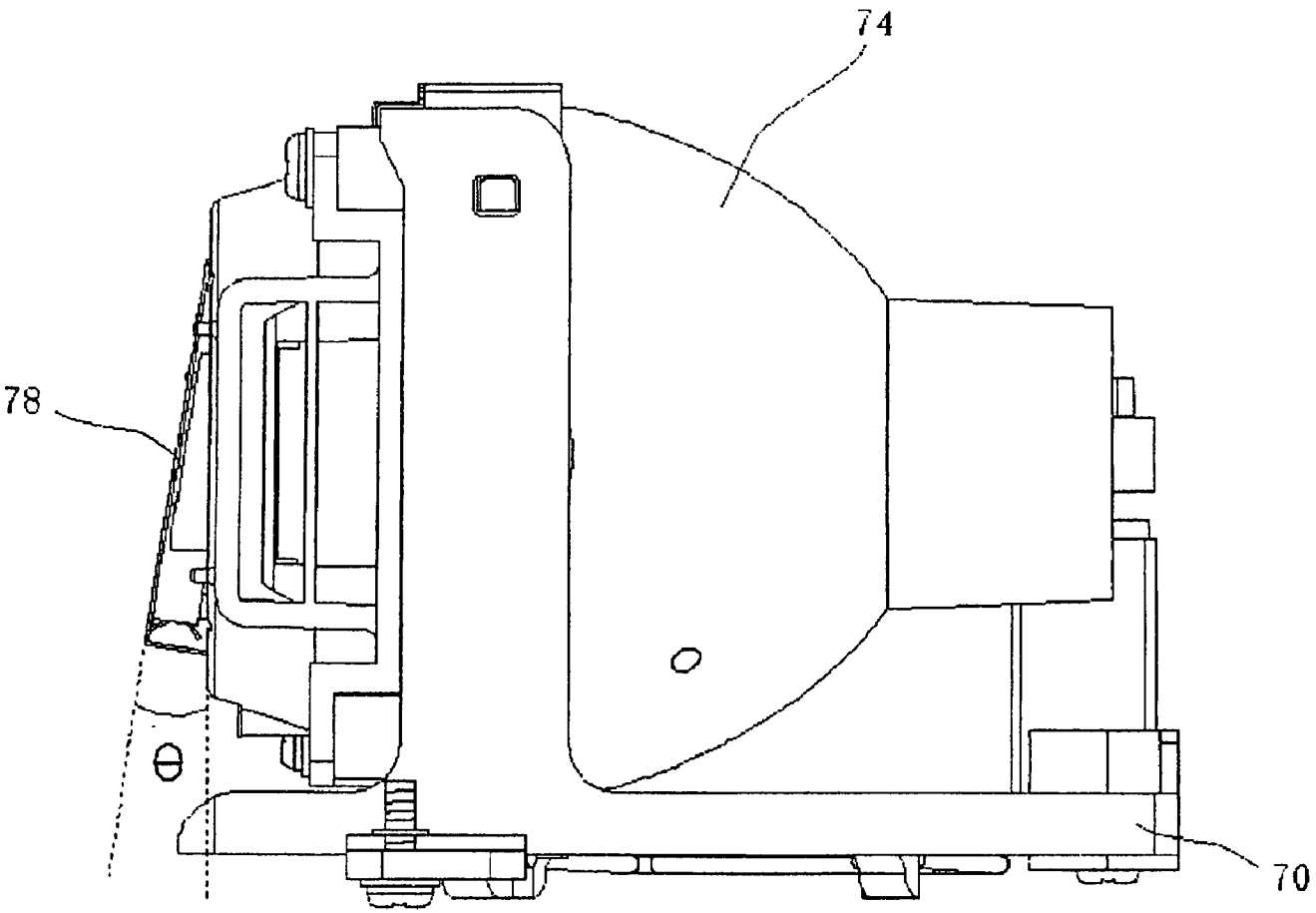
FIG. 6 is an external side view of a practical embodiment according to the present invention.
Figure 7:
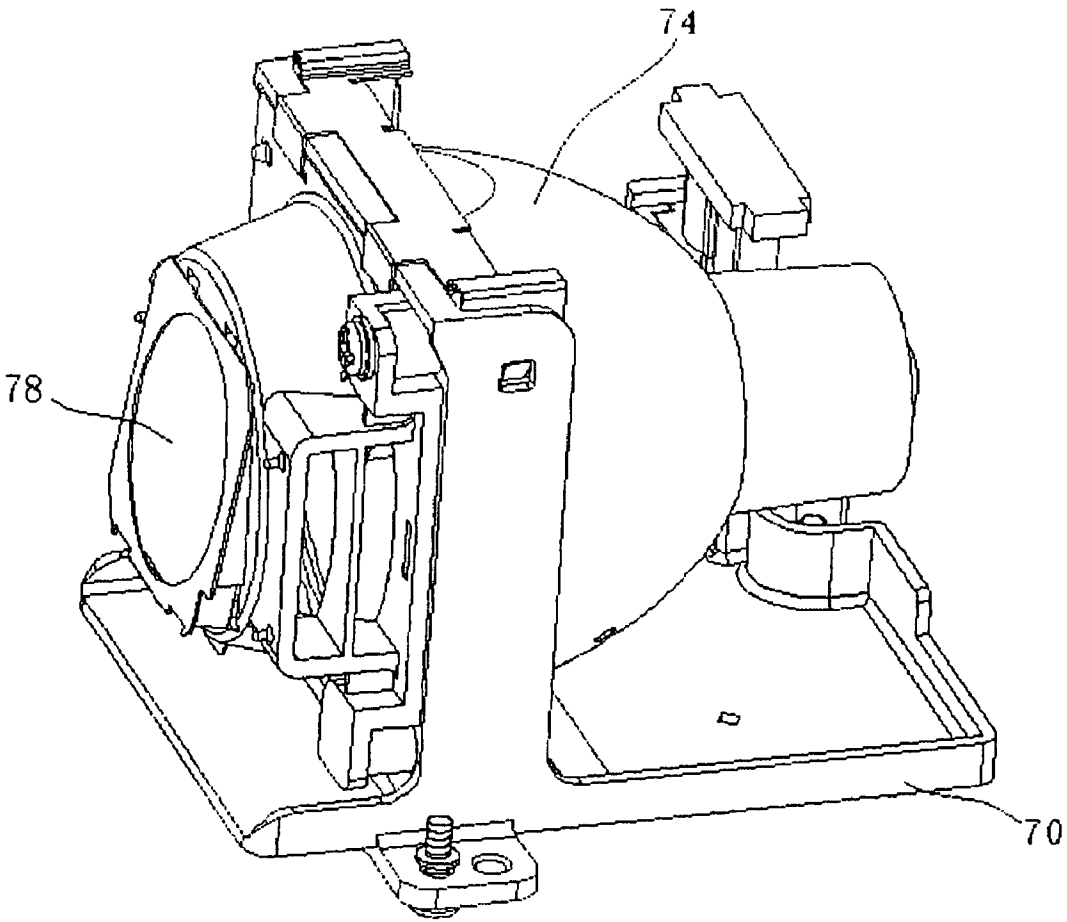
FIG. 7 is a three-dimensional view of the practical embodiment shown in FIG. 6.

The above-mentioned components in the image projection system, including the light source, the reflective housing, and invisible-light reflector, can be designed to form an integral structure. Please refer to FIG. 6 and FIG. 7. FIG. 6 is an external side view of an practical embodiment, and FIG. 7 is a three-dimensional view of the practical embodiment shown in FIG. 6. A reflective housing 74 and an invisible-light reflector 78 are shown in both FIG. 6 and FIG. 7. In addition, inside the reflective housing 74, a supporting frame 70 and a light source are included, and all the components can form an integral structure.

FIG. 6 and FIG. 7 clearly show the invisible-light reflector 78 is installed close to an opening of the reflective housing 74 tilted by a predetermined angle θ not equal to 0 degrees. The invisible-light reflector 78 should be large enough to totally cover the opening of the reflective housing 74 to block the invisible light. Please notice that, when being practically implemented, the invisible-light reflector 78 may comprise glass coated with a plurality of coatings for efficiently reflecting the invisible light. Because the power of the light beam generated by the light source may be high enough to damage the invisible-light reflector 78 (the damage is mainly caused by the infrared rays), the plurality of coatings can be applied to one side of the glass which is most distant from the opening of the reflective housing 74.

In the present invention, an image projection system is installed with an invisible-light reflector for confining invisible light, including infrared rays and ultraviolet rays, in an accommodating space formed by a reflective housing for protecting the image projection system. In addition, the invisible-light reflector is installed according to a predetermined angle and a predetermined position for avoiding damage to the light source and the reflective housing of the image projection system caused by the invisible light.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image projection system comprising:

a light source for generating a light beam;

a reflective housing comprising an opening, the opening having a diameter smaller than a maximum diameter of the reflective housing, the reflective housing forming an accommodating space, the light source installed inside the accommodating space so that the light beam generated by the light source substantially propagates along an optical path through the opening away from the accommodating space, wherein the reflective housing is substantially parabolic shaped, and the optical path is a substantially parallel route by which the light beam propagates after being reflected by the parabolic reflective housing; and an invisible-light reflector installed at a reflecting position intersecting with the optical path outside the opening of the reflective housing, a normal of the invisible-light reflector and the optical path intersecting to form a predetermined angle so that invisible light of the light beam emitted from the opening will be reflected back into the accommodating space;

wherein the predetermined angle formed by the normal of the invisible-light reflector and the optical path is an acute angle not equal to zero degrees, so that infrared rays of the light beam reflected back into the accommodating space by the invisible-light reflector will not focus on the reflective housing.

2. The image projection system of claim 1, wherein the image projection system further comprising a light tube connected to the light source, wherein the infrared rays of the light beam reflected back into the accommodating space by the invisible-light reflector will not focus on the light tube.

3. The image projection system of claim 1, wherein the acute angle is smaller than 45 degrees.

4. The image projection system of claim 1, wherein the image projection system further comprises an image module, the image module comprising a plurality of controllable optical reflectors for modulating the light beam passing through the invisible-light reflector to generate a projecting beam containing an optical image, wherein the light beam passing through the invisible-light reflector does not comprise the infrared rays.

5. The image projection system of claim 4, wherein the image module is a digital micro-mirror device.

6. The image projection system of claim 1, further comprising an image module, wherein the image module is a liquid crystal panel.

7. The image projection system of claim 1, wherein the invisible-light reflector is immediately adjacent to the reflective housing along the optical path.

8. An image projection system comprising:

a light source for generating a light beam;

a parabolic reflective housing comprising an opening, the parabolic reflective housing forming an accommodating space, the light source installed inside the accommodating space so that the light beam generated by the light source substantially propagates along an optical path through the opening away from the accommodating space; and an invisible-light reflector installed at a reflecting position intersecting with the optical path outside the opening of the parabolic reflective housing, a normal of the invisible-light reflector and the optical path intersecting to form a predetermined angle so that invisible light of the light beam emitted from the opening will be reflected back into the accommodating space;

wherein the predetermined angle formed by the normal of the invisible-light reflector and the optical path is an acute angle not equal to zero degrees, so that infrared rays of the light beam reflected back into the accommodating space by the invisible-light reflector will not focus on the parabolic reflective housing.

9. The image projection system of claim 8, wherein the optical path is a parallel route by which the light beam propagates after being reflected by the parabolic reflective housing.

*10. A light source module comprising:*

*a light source for generating a light beam;*

*a reflective housing comprising an opening, the opening having a diameter smaller than a maximum diameter of the reflective housing, the reflective housing forming an accommodating space, the light source installed inside the accommodating space so that the light beam generated by the light source substantially propagates along an optical path through the opening away from the accommodating space, wherein the reflective housing is substantially parabolic shaped, and the optical path is a substantially parallel route by which the light beam propagates after being reflected by the parabolic reflective housing; and*

*an invisible-light reflector installed at a reflecting position intersecting with the optical path outside the opening of the reflective housing, a normal of the invisible-light reflector and the optical path intersecting to form a predetermined angle so that invisible light of the light beam emitted from the opening will be reflected back into the accommodating space;*

*wherein the predetermined angle formed by the normal of the invisible-light reflector and the optical path is an acute angle not equal to zero degrees, so that infrared rays of the light beam reflected back into the accommodating space by the invisible-light reflector will not focus on the reflective housing.*

*11. The light source module of claim 10, wherein the acute angle is smaller than 45 degrees.*

*12. The light source module of claim 10, wherein the invisible-light reflector is immediately adjacent to the reflective housing along the optical path.*

*13. The light source module of claim 10, wherein the light source module further comprises a supporting frame, the supporting frame having a bottom portion extending below the invisible-light reflector and the reflective housing, and a lateral portion extending upward and fixing the reflective housing.*

*14. The light source module of claim 13, wherein the lateral portion extending upward from the middle of the bottom portion, so the supporting frame is T shaped in side view.*

*15. A light source module comprising:*

*a light source for generating a light beam;*

*a parabolic reflective housing comprising an opening, the parabolic reflective housing forming an accommodating space, the light source installed inside the accommodating space so that the light beam generated by the light source substantially propagates along an optical path through the opening away from the accommodating space; and*

*an invisible-light reflector installed at a reflecting position intersecting with the optical path outside the opening of the parabolic reflective housing, a normal of the invisible-light reflector and the optical path intersecting to form a predetermined angle so that invisible light of the light beam emitted from the opening will be reflected back into the accommodating space;*

*wherein the predetermined angle formed by the normal of the invisible-light reflector and the optical path is an acute angle not equal to zero degrees, so that infrared rays of the light beam reflected back into the accommodating space by the invisible-light reflector will not focus on the parabolic reflective housing.*

*16. The light source module of claim 15, wherein the optical path is a parallel route by which the light beam propagates after being reflected by the parabolic reflective housing.*

*17. The light source module of claim 15, wherein the light source module further comprises a supporting frame, the supporting frame having a bottom portion extending below the invisible-light reflector and the reflective housing, and a lateral portion extending upward and fixing the reflective housing.*

*18. The light source module of claim 17, wherein the lateral portion extending upward from the middle of the bottom portion, so the supporting frame is T shaped in side view.*

*19. A light source module comprising:*

*a light source for generating a light beam;*

*a reflective housing comprising an opening, the reflective housing forming an accommodating space, the light source installed inside the accommodating space so that the light beam generated by the light source substantially propagates along an optical path through the opening away from the accommodating space;*

*an invisible-light reflector installed at a reflecting position intersecting with the optical path outside the opening of the reflective housing, a normal of the invisible-light reflector and the optical path intersecting to form a predetermined angle so that invisible light of the light beam emitted from the opening will be reflected back into the accommodating space; and*

*a supporting frame having a bottom portion and a lateral portion, the bottom portion extending below the invisible-light reflector and the reflective housing, and the lateral portion extending upward and fixing the reflective housing;*

*wherein the predetermined angle formed by the normal of the invisible-light reflector and the optical path is an acute angle not equal to zero degrees, so that infrared rays of the light beam reflected back into the accommodating space by the invisible-light reflector will not focus on the reflective housing.*

*20. The light source module of claim 19, wherein the lateral portion extending upward from the middle of the bottom portion, so the supporting frame is T shaped in side view.*

* * * * *